United States Patent [19]

Uchinishi

[11] Patent Number: 4,621,596
[45] Date of Patent: Nov. 11, 1986

[54] EXHAUST CONTROL SYSTEM
[75] Inventor: Eizaburo Uchinishi, Hyogo, Japan
[73] Assignee: Kawasaki Jukogyo Kabushiki Kaisha, Japan
[21] Appl. No.: 666,305
[22] Filed: Oct. 30, 1984
[30] Foreign Application Priority Data Nov. 2, 1983 [JP] Japan .................. 58-206379

[51] Int. Cl.⁴ ............................................. F02D 39/04
[52] U.S. Cl. ............................... 123/65 PE; 123/65 V
[58] Field of Search ............ 123/65 P, 65 PE, 65 PD, 123/65 EM, 65 R, 65 V

[56] References Cited

U.S. PATENT DOCUMENTS

| | | | |
|---|---|---|---|
| 948,336 | 2/1910 | Moore | 123/65 V |
| 1,514,476 | 11/1924 | Still | 123/65 V |
| 2,401,858 | 6/1946 | Clark | 123/65 V |
| 2,720,872 | 10/1955 | Yokoi | 123/65 V |
| 4,121,552 | 10/1978 | Mithuo et al. | 123/65 PE |
| 4,285,311 | 8/1981 | Iio | 123/73 V |
| 4,368,703 | 1/1983 | Shibata | 123/65 PE |

FOREIGN PATENT DOCUMENTS

| | | | |
|---|---|---|---|
| 2447586 | 4/1976 | Fed. Rep. of Germany | 123/65 P |
| 52-132916 | 10/1977 | Japan . | |
| 54-158514 | 12/1979 | Japan | 123/65 PE |
| 58-7059 | 2/1983 | Japan . | |

Primary Examiner—Craig R. Feinberg
Assistant Examiner—David A. Okonsky
Attorney, Agent, or Firm—Leydig, Voit & Mayer

[57] ABSTRACT

An exhaust control system for a 2-cycle engine having at least one combustion cylinder with a longitudinal axis comprises a main exhaust passage and an exhaust sub-passage communicating with the cylinder through respective main and sub-exhaust ports. The sub-port is located laterally of and in spaced relationship to the main exhaust port and further lies in a common plane arranged perpendicular to the cylinder axis. A control means is included which varies the degree of opening of the exhaust sub-passage in accordance with engine speed whereby timing of the ports is not altered.

8 Claims, 5 Drawing Figures

EXHAUST CONTROL SYSTEM

FIELD OF THE INVENTION

The present invention relates to an exhaust port and passage system for 2-cycle engines mounted on, for example, motorcycles.

BRIEF DESCRIPTION OF THE DRAWINGS

FIG. 1b is a horizontal sectional view of the engine shown in FIG. 1a;

DESCRIPTION OF THE PRIOR ART

Figure 1A:
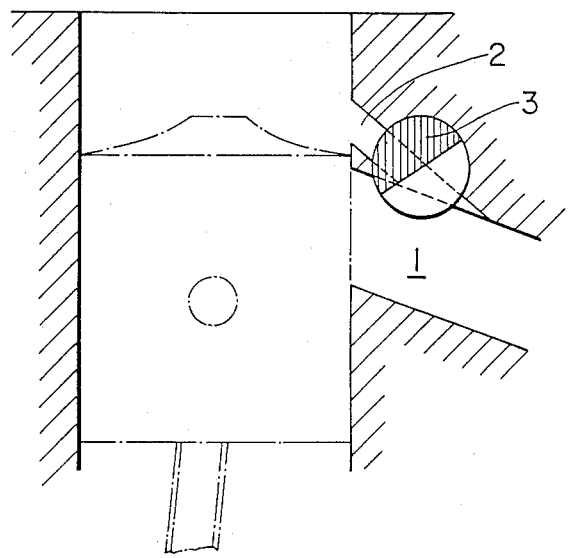
FIG. 1a is a schematic vertical sectional view of a prior art 2-cycle internal combustion engine showing, particularly, a portion of the engine around its exhaust port and passage.
Figure 1B:
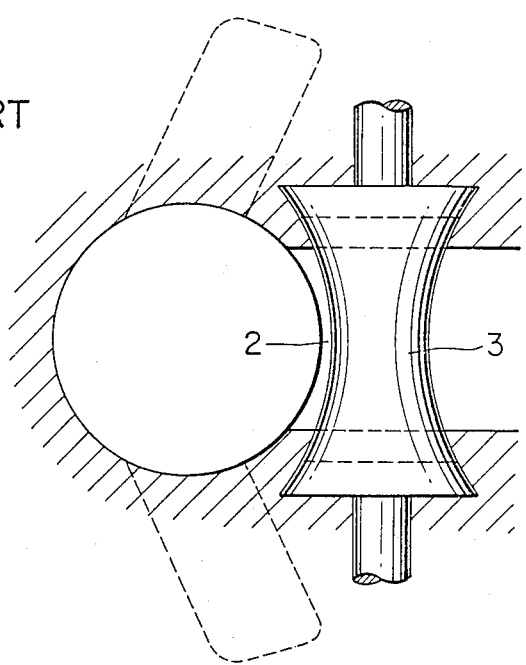

As will be seen from FIGS. 1a and 1b, the exhaust system of a conventional 2-cycle engine has two exhaust passages which communicate with the combustion cylinder through ports, namely, a main passage 1 and a sub-passage 2. The sub-passage 2 opens to the combustion chamber at a position slightly above the main passage 1 and extends obliquely to open in a portion of the main passage 1 close to the opening to the combustion chamber. A valve 3 having a semi-circular cross-section and a drum-like form contracted at its mid portion is mounted rotatably in the vicinity of the sub-passage 2 such that the total exhaust port area, i.e., the sum of the areas of the main port 1 and the sub-through which the passage port through which the sub-passages 2, communicate with the combustion cylinder, is optimized in relation tot he engine speed through varying the opening area of the sub-passage 2 by means of the valve 3.

In 2-cycle engines, a change of the vertical position of the exhaust port by a small amount, say 0.2 to 0.3 mm, causes a change in the exhaust timing of 1 to 2° in terms of the crank angle. The change in the exhaust timing seriously affects the performance of the engine and, therefore, has to b controlled very strictly.

In the conventional 2-cycle engine having the exhaust system explained hereinbefore, the vertical distance btween the openings of the main port which communicates with the main exhaust passage 1 and the sub-port which communicates with the sub-passage 2 is large large so that, when the valve 3 is rotated to open the sub-passage 2 in order to provide a large total exhaust area optimal for high-speed operation of the engine, the exhaust timing is changed and this variation in the exhaust timing causes a change in the operation characteristics of the engine. In addition, since a part of the fresh mixture escapes through the sub-port 2 in the compression stroking of the engine, the compression ratio is descreased such as to seriously impair the performance of the engine and hence to reduce the power of the engine in high-speed operation. To obviate this problem, it would be effective to arrange the location of the sub-port and sub-passage 2 to conform as closely as possible to the location of the main passage 1 so as to minimize the vertical distance between the openings or ports of the sub-passage 2 and the main passage 1. Such an arrangment, however, seriously decreases the mechanical strength of the portion of the cylinder wall between the openings to the main passage 1 and the sub-passage 2. In addition, this arrangement is quite difficult to realize from the viewpoint of machining.

Examples of such an arrangement are disclosed in Japanese Utility Model Publication No. 7059/1983 and Japanese Utility Model Laid-Open No. 132916/1977.

SUMMARY OF THE INVENTION

Accordingly, an object of the invention is to provide an exhaust system wherein the total area of exhaust passages of the system is adjustable, while maintaining optimal exhaust timing to ensure higher power of the engine even at high-speed operation.

To this end, according to the invention, there is provided an exhaust port system for a 2-cycle internal combustion engine comprising a main exhaust passage communicating with a combustion cylinder through a main exhaust port a sub-passage communicating with the combustion chamber through; a sub-port the sub-port located laterally of and in spaced relationshop to the main exhaust port and communicating with an intermediate portion of the main the exhaust sub-port and the main exhaust port lying in a common plane arranged perpendicular to the longitudinal axis of the cylinder; and a controller for changing the opening area of the sub-port in accordance with the engine speed. The timing of opening and closing of the exhaust ports of the present invention is unaltered due to the opening and closing of the exhaust sub-port.

Other and further objects, features and advantages of the invention will appear more fully from the following description.

DESCRIPTION OF THE PREFERRED EMBODIMENT

Figure 2:
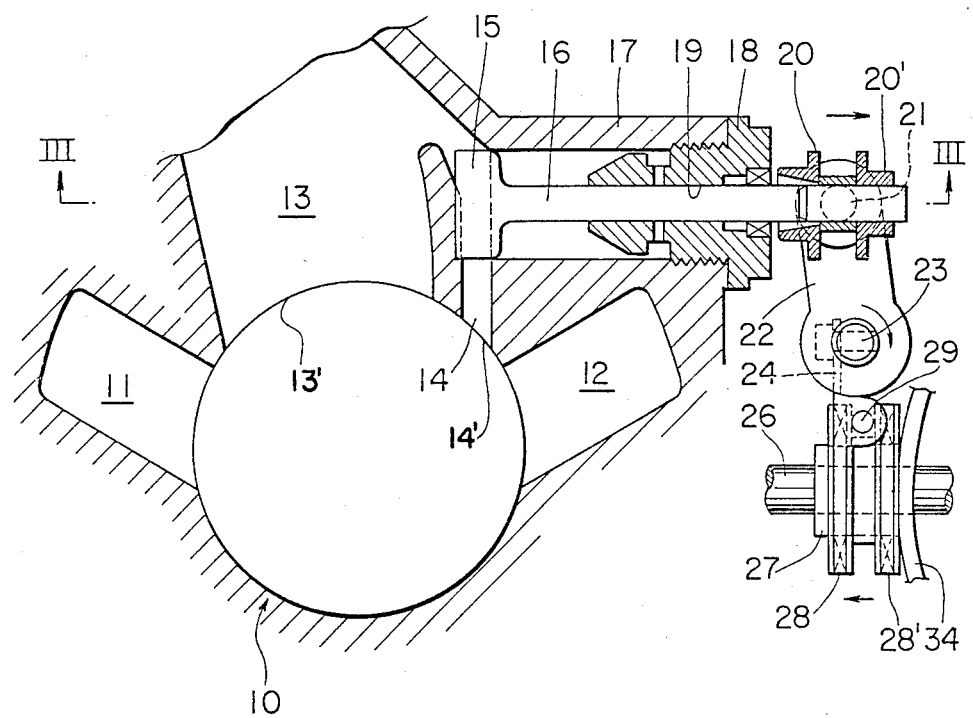
FIG. 2 is a horizontal sectional view of a 2-cycle engine equipped with an exhaust port system in accordance with the present invention, showing particularly an essential part of the controller.
Figure 3:
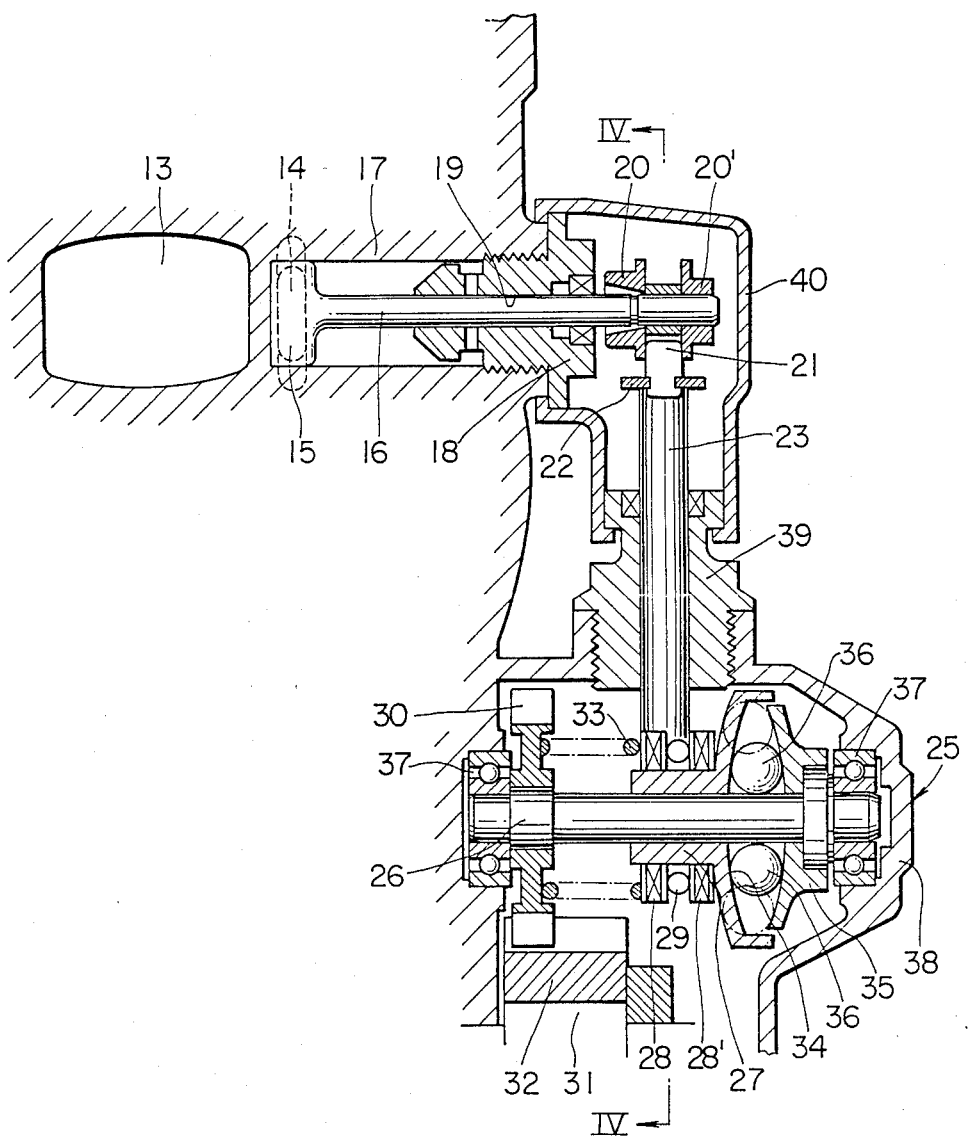
FIG. 3 is a vertical sectional view taken along the line III—III of FIG. 2.
Figure 4:
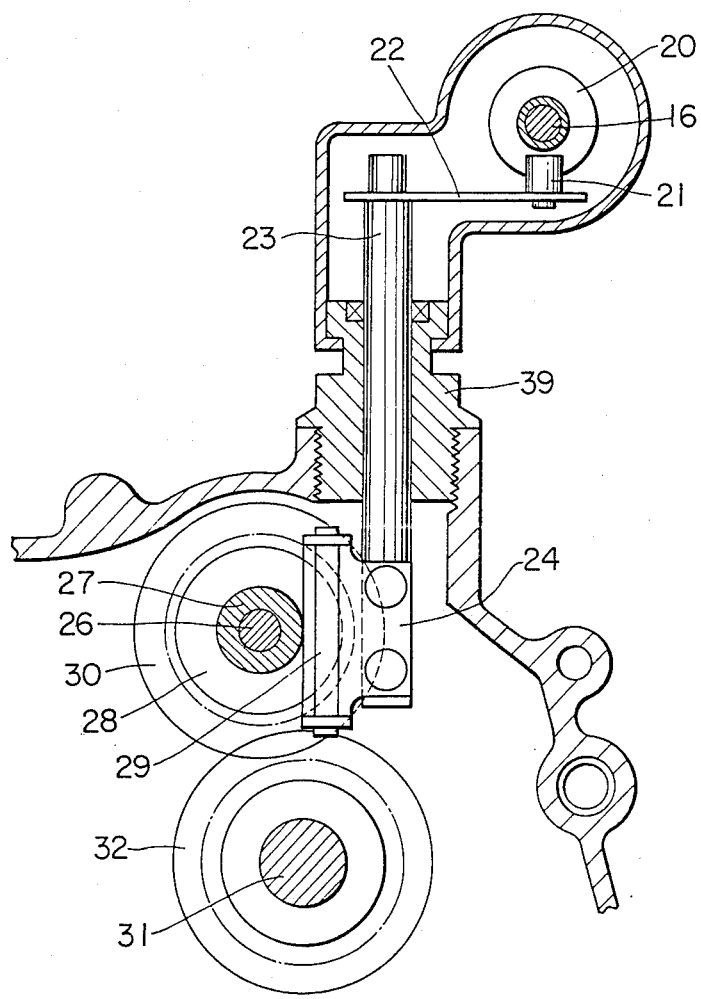
FIG. 4 is a vertical sectional view taken along the line IV—IV of FIG. 3.

FIGS. 2 to 4 in combination show a 2-cycle engine equipped with an exhaust port system in accordance with the invention. Referring first to FIG. 2, the engine has a cylinder 10 in which are formed scavenging ports which communicate with corrsponding scavenging passages 11, 12, a main exhaust port 13' which communicates with a main exhaust passage 13 and an exhaust sub-port which cmmunicates with a sub-passage 14' spaced laterally from the main port 13' and main exhaust passge 13 and located substantially at the same height as the main port 13' and main passage 13. The sub-passage 14 is communicated with an intermediate portion of the main passage 13.

A valve 15 for changing the opening area of the sub-passage 14 is disposed at an intermediate portion of the sub-passage 14. The valve 26 is slidably supported by a sleeve 17 which is disposed at a lateral side of the sub-passage 14. More specifically, the valve 15 has a rod or stem 16 which slidably extends through a central bore 19 formed in a plug 18 screwed into the sleeve 17. The outer end of the central bore 19 is sealed suitably.

As will be best seen from FIG. 3, a pair of adjusting nuts 20 and 20' are screwed to the outer end of the rod 16. A pin 21 sandwiched between two adjusting nuts 20 and 20' extends downwardly. As shown in FIG. 4, the lower end of the pin 21 is connected to one end of a lever 22, and the other end of which is connected to the upper end of a vertical rotary shaft 23. As will be seen from FIGS. 2 and 4, one end of the lever 24 is connected to the lower end of the vertical shaft 23, and the other end of the lever 24 is connected to a pin 29 which is disposed between a pair of adjusting plates 28, 28' fixed on the periphery of a slider 27 which in turn is slidably mounted on a rotary shaft 26 of a rotary-type governor 25 shown in FIG. 3. As shown in FIG. 3, a gear 30 fixed to the rotary shaft 26 of the governor 25 engages with a gear 32 provided on the end of a crankshaft 31. The rotary governor 25 has a spring 33 stretched between the gear 30 on the rotary shaft 26 and the adjusting plate 28'. Balls 36 arranged between a saucer-like ball retaining plate 34 provided on the end on the slider 27 and an opposing ball retaining plate 35 fixed to the rotary shaft 26. As shown in FIG. 3, the rotary shaft 26 is supported by a crankcase 38 through a bearing 37, while the vertical rotary shaft 23 extends through a support 39 which is hermetically screwed at its lower end to an upper portion of the crank case 38. The upper end of the support 39 is coupled to a substantially cylindrical cover 40 which covers the outer end of the valve rod 16, lever 22, vertical rotary shaft 23 and other associated parts.

In operation, when the engine speed is low, only a small centrifugal force acts on the balls 36 arranged between the saucer-shaped ball retaining plate 34 and the opposing ball retainig plate 35 because the rotation speed of the rotary shaft 26 is correspondingly low. Therefore, the slider 27 does not slide apprecialby. Therefore, the pin 29, lever 24, vertical shaft 23 and the lever 22 do not rotate so that the valve rod 16 connected to the lever 22 through the pin 21 does not slide. In consequence, the valve 15 remains to close the sub-passage 14. In this state, the exhaust port system provides an area of exhaust passage constituted solely by the sectional area of the main exhaust passage 13 which suits with the low-speed engine operation.

As the engine is accelerated, the speed of the rotary shaft 26 of the governor 25 and hence the centrifugal force acting on the balls 36 between the ball retainer plates 34 and 35 are increased correspondingly. In consequence, the balls 36 are displaced radially outwardly urging the ball-retaining plate 34 to the left as viewed in FIG. 3 against the force of the spring 33 so that the slider 27 integral with the ball-retaining plate 34 is moved to the left. This movement causes rotation of the pin 24, vertical rotary shaft 23, lever 22 and other parts shown in FIGS. 2 and 4. As a result, the valve rod 16 connected to the lever 22 through the pin 21 slides in the bore 19 formed in the plug 18 whereby the valve 15 is retracted into the sleeve 17 such as to gradually increase the degree of opening of the sub-passage 14. Thus, the total area of the exhaust passage of the exhaust system, which is given as the sum of the opening areas of the main passage 13 and that of the sub-passage 14, is gradually increased to match with the high-speed engine operation.

In the event of an over-run or maximum speed operation of the engine, the valve 15 is fully retracted into the sleeve 17 to fully open the sub-passage 14. In this state, the exhaust system provides the maximum area of the exhaust passage which is given as the total areas of both exhaust passages 13 and 14, matching the maximum speed operation of the engine.

As has been described, in th exhaust system of the invention, the degree of area of opening of the sub-port disposed at a lateral side of the main port is changed by a valve in accordance with the engine speed such that the degree of opening of the sub-port is small when the engine speed is low but is increased as the engine is accelerated, until the sub-port is opened fully at the maximum engine speed. Consequently, the exhaust area is optimized for various engine speeds to ensure constantly efficient operation of the engine. In addition, since the exhaust sub-port and sub-passage are disposed substantially at the same height as the main port and main passage, the undesirable early escape of the mixture through the sub-passage during high-speed operation of the engine is avoided thus ensuring a constant compression ratio in the cylinder. As a result, the performance of the engine is improved particularly in the high-speed range, while reducing the fuel consumption. In addition, since the sub-port is sufficiently spaced from the main port, it is possible for the portion of the cylinder wall between both ports to have a substantial mechanical strength and the production of the cylinder is facilitated as compared with that having a conventional exhaust port system.

Having described a specific embodiment of our invention, it is believed obvious that modification and variation of our invention is possible in light of the above teachings.

What is claimed is:

1. An exhaust control system for a 2-cycle engine having at least one combustion cylinder with a longitudinal axis comprising:
    a main exhaust passage communicating with said cylinder through a main exhaust port;
    an exhaust sub-passage communicating with said cylinder through an exhaust sub-port, said sub-port located laterally of and in spaced relationship to said main exhaust port, said exhaust sub-port and said main exhaust port lying in a common plane arranged perpendicular to said longitidinal axis; and
    controlling means for varying the degree of opening of said sub-passage in accordance with engine speed whereby timing of opening and closing of said exhaust ports is not altered due to opening and closing of said exhaust sub-port.

2. An exhaust control system for a 2-cycle engine according to claim 1 wherein said controlling means includes an axially movable valve positionable to variably block said sub-port, a lever mechanism connected to said valve and adapted to move said valve axially to change the degree of opening of said sub-port, a rotary governor connected to said lever mechanism and adapted to actuate said lever mechanism, and a gear mechanism connected to the crankshaft of said engine and adapted to drive said rotary governor.

3. An exhaust control system according to claim 1 wherein said controlling means includes an axially movable valve positionable to variably block said sub-passage.

4. An exhaust control system according to claim 1 wherein said controlling means includes an axially movable valve positionable to variably block said exhaust sub-passage wherein said exhaust sub-passage remains closed with respect to said main exhaust passage when the engine operates at a low engine speed and is successively opened with respect to the main exhaust passage as speed of the engine increases.

5. An exhaust control system according to claim 1 wherein said exhaust sub-passage communicates at one end with said cylinder and at the other end with said main exhaust passage, and said valve is located proximate to a juncture of said exhaust sub-passage and said main exhaust passage.

6. An exhaust control system according to claim 1 wherein said movable valve is slidably supported by a sleeve.

7. An exhaust control system according to claim 6 wherein said valve has a stem which is slidably supported within a central bore formed in a plug located within said sleeve.

8. An exhaust control system according to claim 6 wherein said movable valve has a stem having a longitudinal axis arranged parallel to said plane.

* * * * *